United States Patent [19]

Koisuka et al.

[11] Patent Number: 4,678,112
[45] Date of Patent: Jul. 7, 1987

[54] METHOD FOR PRODUCING A HEAT EXCHANGER HAVING A FLAT TUBE AND HEADER PIPES

[75] Inventors: Mikio Koisuka; Hisao Aoki, both of Gunma, Japan

[73] Assignee: Sanden Corporation, Gunma, Japan

[21] Appl. No.: 678,399

[22] Filed: Dec. 5, 1984

[51] Int. Cl.⁴ ............................................. B23K 31/02
[52] U.S. Cl. ............................ 228/138; 228/183; 228/189; 165/173; 165/178
[58] Field of Search ............... 165/150, 151, 152, 153, 165/173, 178; 285/189, 286, 180, 197; 228/138, 183, 189

[56] References Cited

U.S. PATENT DOCUMENTS

| | | | |
|---|---|---|---|
| 540,336 | 6/1895 | Rubenstein | 285/180 X |
| 2,788,232 | 4/1957 | Stadthaus | 285/286 X |
| 3,183,023 | 5/1965 | Morrison | 285/189 X |
| 3,238,606 | 3/1966 | Tolson | 228/183 X |
| 3,325,193 | 6/1967 | Castello | 285/189 |
| 3,589,440 | 6/1971 | Friedrich | 165/153 X |
| 3,712,272 | 1/1973 | Carnavos et al. | 165/78 X |
| 3,746,370 | 7/1973 | Aulisa | 285/197 X |
| 4,018,464 | 4/1977 | Acda et al. | 285/180 X |
| 4,155,572 | 5/1979 | Bretone, Jr. | 285/197 |
| 4,273,364 | 6/1981 | DeLange | 285/197 |
| 4,277,013 | 7/1981 | Spanoudis | 228/183 X |
| 4,353,224 | 10/1982 | Nonogaki et al. | 165/110 X |

Primary Examiner—Albert W. Davis, Jr.
Assistant Examiner—Richard P. Cole
Attorney, Agent, or Firm—Hopgood, Calimafde, Kalil, Blaustein & Judlowe

[57] ABSTRACT

In production of a serpenting-type aluminum heat exchanger having an aluminum flat tube with a plurality of fluid passageways and aluminum header pipes connected to opposite ends of the flat tube, flat sleeves with outer end flanges of aluminum alloy brazing filler metal are fitted on the opposite end portions of the flat tube while the end flanges being in contact with outer surfaces of the header pipes. The sleeves and end flanges are melted by heating so that the header pipes are brazed to the flat tube.

5 Claims, 7 Drawing Figures

METHOD FOR PRODUCING A HEAT EXCHANGER HAVING A FLAT TUBE AND HEADER PIPES

BACKGROUND OF THE INVENTION (1) Field of the Invention

The present invention relates to a method for producing a heat exchanger having a flat metal tube with a plurality of fluid passageways and header pipes connected to opposite ends of the flat tube, and in particular, to a method for joining and connecting the header pipe to an end of the flat tube.

(2) Description of the Prior Art

As a typical heat exchanger having a flat metal tube with a plurality of fluid passageways therein and fluid inlet and outlet tubes connected to the flat metal tubes through header pipes on opposite ends of the flat metal tube, a serpentine-type heat exchanger is known in the prior art which is used for, for example, a refrigerant evaporator in an automotive air conditioning system, as shown in, for example, U.S. Pat. Nos. 4,350,025 and 4,353,224.

The serpentine heat exchanger comprises a flat metal tube formed in a serpentine-anfractuous shape to have a plurality of parallel portions spaced apart from one another. A plurality of corrugated fin units are disposed in spaces between adjacent ones of the parallel portions of the tube and are joined thereto by brazing. Header pipes are fixedly mounted on opposite ends of the flat tube, respectively, and an inlet tube and an outlet tube are connected to the header tubes, respectively.

In U.S. Pat. No. 4,353,224, only header pipes are shown at 3 and 4 in FIG. 1 of the drawing, while header pipes are shown at 3 and 5 in FIG. 5 of U.S. Pat. No. 4,350,025 which are integral with the inlet tube and the outlet tube, respectively.

In practical arrangement, header pipes are formed as different parts from the inlet and outlet pipes and are connected thereto.

The flat tube and the fin units are made of high heat-conductivity materials, such as aluminum alloys. Usually, the serpentine-anfractuous flat tube is made of an aluminum metal having 99 wt. % or more Al, for example, AA (Aluminum Association in U.S.A.) 1050 which comprises, by weight, 0.25% or less Si, 0.40% or less Fe, 0.05% or less Cu, 0.05% or less Mn, 0.05% or less Mg, 0.05% or less Zn, 0.03% or less Ti and 99.50% or more Al, or AA 3003 which comprises, by weight, 0.6% or less Si, 0.7% or less Fe, 0.05-0.20% Cu, 1.0-1.5% Mn, 0.10% or less Zn and the balance Al. The corrugated fin unit is made of an aluminum alloy brazing sheet which has a core metal of, for example, AA 3003 with a cladding of an aluminum alloy brazing filler metal, such as AA 4343, 4045 or 4047 (which comprises, by weight, 0.30% or less Cu, 5-13% Si, 0.8% or less Fe, 0.15% or less Mn, up to 0.1% Mg, 0.20% or less Zn, up to 0.20% Ti, and the balance substantially Al).

The corrugated fin units of the aluminum alloy brazing sheet are assembled to the serpentine-anfractuous flat tube of the aluminum alloy, and thereafter, deposited into a brazing furnace. Thus, corrugated fin units are brazed and joined to the flat tube.

Header pipes are usually made of the aluminum alloy brazing sheet similar to the corrugated fin unit. The header pipes are assembled onto the flat tube before being deposited into the brazing furnace. Therefore, the header pipes are also brazed and joined to the flat tube simultaneously with brazing of the corrugated fin units to the flat tube.

Thereafter, the inlet tube and the outlet tube are connected to respective header pipes by, for example, TIG (Tungsten-inert gas) welding, while maintaining predetermined orientations of the tubes.

In brazing the header tubes to the flat tube in a condition wherein the header tubes are disposed at a level lower than the flat tube, the molten brazing filler metal flows down along the surfaces of the header pipes, and the brazing filler metal is not sufficiently fed to the connecting portions of the header pipes and the flat tube. As a result, a reliable joint of the header pipe and the flat tube is not obtained.

Furthermore, in the known production method, it is difficult to connect and join the inlet pipe and the outlet pipe to header pipes, respectively, while maintaining predetermined orientations of the tubes.

SUMMARY OF THE INVENTION

It is therefore an object of the present invention to provide a method for reliably and readily joining and connecting a header pipe to one end of a flat tube in production of a heat exchanger having the flat tube with a plurality of fluid passageways and header pipes fixed onto opposite ends of the flat tube.

It is another object of the present invention to provide a method for producing a heat exchanger having a flat tube with a plurality of fluid passageways, header pipes fixed onto opposite ends of the flat tube, and an inlet tube and an outlet tube connected to the header pipes, respectively, wherein said inlet and outlet tubes have been previously formed integral with corresponding header pipes, respectively.

The present invention is directed to a method for joining a header pipe to an end of a flat metal tube having a plurality of fluid passageways therein in production of a heat exchanger comprising the flat tube, and header pipes joined onto opposite ends of said flat metal tube. The method according to the present invention is characterized by forming an axial slot in a side wall of the header pipe for receiving the end of the flat tube therethrough; preparing a brazing member of a brazing filler metal, the brazing member comprising an elongated plate portion arcuately curved transversely with a lengthwise elongated opening therein, and with a flat sleeve portion projecting from an outer surface of said elongated plate portion overlying said elongated opening in registration therewith, said sleeve portion having an inner surface congruent with the perimeter of said elongated opening, said sleeve portion inner surface and said elongated opening having an inner contour slightly larger than the outer contour of said flat tube; inserting the end of the flat tube through the sleeve portion and the elongated opening of the brazing member and thereafter inserting the flat tube end into the header pipe through the axial slot thereof while bringing the arcuately curved plate portion in contact with the outer surface of the header pipe, and then heating the brazing member together with the header pipe and a portion at the end of the flat tube to melt the brazing member, so that the header pipe is joined and brazed to the end of the flat tube.

According to the present invention, since the header pipe is made not of brazing sheet but of metal similar to that of the flat tube and the inlet or outlet tubes connected to the header pipe, the inlet tube and the outlet tube can be previously formed integral with corresponding header pipes, respectively. Therefore, separate joining and connecting of the inlet and outlet tubes to corresponding header pipes can be omitted.

Further objects, features and other aspects of the present invention will be understood from the following detailed description of preferred embodiments of the present invention referring to the accompanying drawings.

DETAILED DESCRIPTION OF PREFERRED EMBODIMENTS

Figure 1:
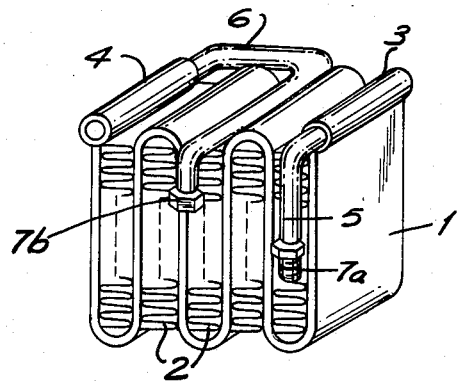
FIG. 1 is a perspective view of a typical serpentine-type heat exchanger according to the present invention.

Referring to FIG. 1, a heat exchanger according to an embodiment of the present invention generally has an arrangement similar to a typical serpentine-type heat exchanger. The heat exchanger has a serpentine-anfractuous flat tube 1 of, for example, an aluminum alloy AA 1050. Corrugated fin units 2 are made of, for example, aluminum alloy brazing sheet which has a core metal AA 3003 with cladding of an aluminum alloy brazing filler metal of AA 4045 (which comprises, by weight, 0.30% or less Cu, 9.0–11.0% Si, 0.8% or less Fe, 0.05% or less Mn, 0.05% or less Mg, 0.10% or less Zn, 0.20% or less Ti, and the balance substantially Al). The corrugated fin units 2 are disposed in spaces between adjacent ones of parallel portions of the serpentine-anfractuous flat tube 1. Corrugated fin units are brazed and joined to flat tube 1 by heating the flat tube and the corrugated fin units so assembled thereto in a brazing furnace to melt the cladding metal of the brazing sheet.

Two header pipes 3 and 4 are fixedly mounted on opposite end portions of flat tube 1 so that a plurality of fluid passageways in the flat tube communicate with interiors of header pipes 3 and 4. Each header pipe 3 and 4 has one open end and the other closed end. An inlet tube 5 and an outlet tube 6 are inserted in open ends of header pipes 3 and 4, respectively, and joined and connected thereto with predetermined orientations.

Figure 2:
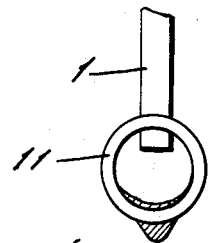
FIG. 2 is a cross-sectional view for illustrating a known brazing process of a header pipe to a flat tube.

In the prior art, in order to braze each header pipe to the flat tube, each header pipe is made of an aluminum alloy brazing sheet similar to the corrugated fin unit. Referring to FIG. 2, each header pipe represented by 11 is provided with an axial long opening or an axial slot (not shown but similar to slots 31 and 41 to be described), in the side wall through which the corresponding end portion of flat tube 1 is inserted. In this condition, header pipe 11 and flat tube 1 are heated in a brazing furnace, and thereby, brazed and joined to one other. Therefore, joining of corrugated fin units 2 to flat tube 1 and joining of each header pipe 11 to flat tube 1 are performed during the same brazing operation after preassembling the corrugated fin units and the header pipes to the flat tube.

After brazing each header pipe 11 to the flat tube, inlet tube 5 and outer tube 6 are inserted into header pipes 11 already brazed to flat tube 1, and are connected or joined thereto by, for example, TIG welding, as mentioned hereinabove.

The prior art method has following problems in brazing of the header pipes to the flat tube and in joining the inlet/outlet tube to the corresponding header pipe.

When the brazing operation of the header pipes to the flat tube is performed in a condition where each header pipe 11 is maintained at a level lower than flat tube 1, as shown in FIG. 2, molten cladding metal flows down along the surfaces of header pipe 11, as shown at 12 in the figure. Therefore, the header pipe 11 is not reliably joined to the flat tube as described hereinabove.

Further, the joining operation of the inlet/outlet tube to the corresponding header pipe is difficult because each tube must be maintained in a predetermined orientation during the operation. If the inlet/outlet tube moves from the predetermined orientation, the free end of the tube, which is provided with coupling means (shown at 7a and 7b in FIG. 1) for connecting with an external fluid pipe, will not be located at a predetermined position with reference to the exchanger body.

According to one embodiment of the present invention, the first problem is avoided.

Figure 3:
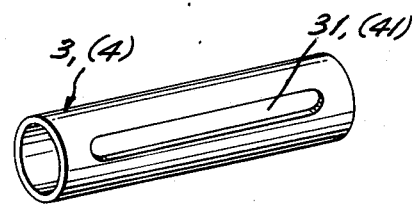
FIG. 3 is a perspective view of a header pipe used in the embodiment of FIG. 1.

Referring to FIG. 3, each header pipe 3 and 4 is made of an aluminum alloy, for example, AA 1050 or AA 3003 and has an axial slot 31 and 41 for receiving the end portion of flat tube 1.

Figure 4:
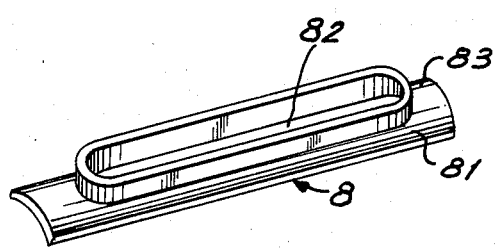
FIG. 4 is a perspective view of a brazing filler member used in the present invention.

Referring to FIG. 4, a brazing filler member 8 is made of an aluminum alloy brazing filler metal. The brazing filler member 8 has an arcuately curved elongated plate portion 81 conforming to the outer cylindrical surface of each header pipe 3 and 4. The arcuately curved plate portion 81 is formed with an elongated opening 82 corresponding to axial slot 31 and 41 of header pipe 3 and 4. A flat sleeve portion 83 projects from the outer surface of elongated plate portion 81 overlying the elongated opening 82 in registration therewith.

Figure 5:
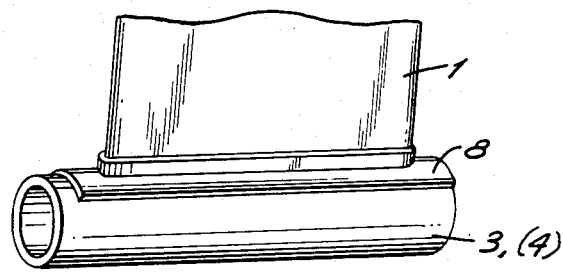
FIG. 5 is a perspective view for illustrating a brazing operation of a header pipe to a flat tube according to the present invention.

Referring to FIG. 5, brazing of each header pipe 3 and 4 to flat tube 1 is carried out by inserting an end of flat tube 1 through sleeve portion 83 and elongated hole 82 to project from the opposite side of the brazing filler member 8, inserting the projected end of flat tube 1 into axial slot 31 (41) of the corresponding header pipe 3 (4) as well as bringing the arcuately curved plate portion 81 into contact with the outer surface of the header pipe 3 (4), as shown in FIG. 5, and then, heating the brazing filler member 8 together with flat tube 1 and header pipes 3 and 4 to melt the brazing filler member 8. Thus, the header tubes 3 and 4 are brazed to flat tube 1, reliably.

According to this method, it will be easily understood that joining of corrugated fin units 2 to flat tube 1 and joining of each header pipe 3 and 4 to flat tube 1 can be performed during the same brazing operation after preassembling the corrugated fin units, header pipes and brazing filler members to the flat tube.

After the brazing operation, the inlet tube 5 and the outlet tube 6 can be connected and joined to respective header pipes 3 and 4 in any known manner, so that the heat exchanger as shown in FIG. 1 is completed.

In the described embodiment, since the inlet/outlet tube is connected to the corresponding header pipe after the brazing operation, the second problem in the prior art is not avoided.

In the method for joining and connecting the header pipe to the flat tube according to the present invention, since the header pipe is made not of the brazing sheet but of the usual unclad aluminum alloy, the header pipe can be formed integral with the inlet/outlet tube. It will be easily understood that the second problem will be removed by the use of such an inlet/outlet tube having a header pipe portion and an inlet/outlet tube portion formed integral therewith.

Figure 6:
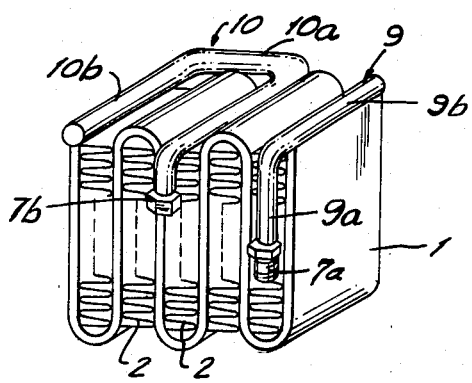
FIG. 6 is a perspective view of another serpentine-type heat exchanger produced according to the present invention.
Figure 7:
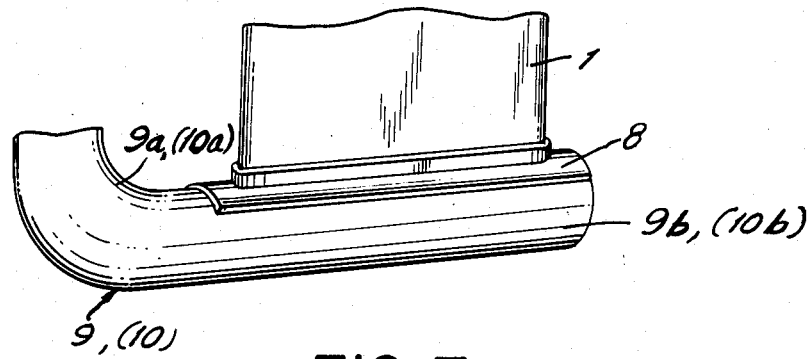
FIG. 7 is a perspective view for illustrating a brazing operation of an inlet/outlet pipe to a flat tube in production of the heat exchanger of FIG. 6.

Referring to FIGS. 6 and 7, an inlet tube portion 9a and a header pipe portion 9b are first made integral with one another from an aluminum alloy such as AA 3003 to form a single part as an inlet pipe 9, while an outlet pipe 10 is also formed of AA 3003 to have an outlet tube portion 10a and a header pipe portion 10b integral with the outlet tube portion.

Each of header pipe portions 9b and 10b is provided with an axial slot similar to slot 31 in FIG. 3.

Flat tube 1 and brazing filler member 8 of FIG. 4 are assembled on header pipe portion 9b (10b) as shown in FIG. 7, in a similar manner to the embodiment FIG. 5. Thereafter, the brazing filler member 8 is heated together with header pipe portion 9b (10b) and flat tube 1 to melt the brazing filler member 8. Thus, the inlet pipe 9 and the outlet pipe 10 are joined to flat tube 1 and the heat exchanger is completed as shown in FIG. 6.

In this embodiment, since it is not necessary to connect the inlet/outlet tube to the header pipe after the brazing operation, the above-mentioned second problem is removed.

What is claimed is:

1. A method for producing a heat exchanger comprising a flat metal tube of an aluminum alloy for conveying fluid, and two header pipes joined respectively onto opposite ends of said flat tube, which comprises the steps of preparing said flat tube and said header pipes of an aluminum alloy other than a brazing filler metal, and preparing two brazing filler members of an aluminum alloy brazing filler metal, each of said header pipes having an axial slot in a side wall for receiving an end of said flat tube therethrough, each brazing filler member comprising an elongated plate portion arcuately curved transversely with a lengthwise elongated opening therein, and with a flat sleeve portion projecting from an outer surface of said elongated plate portion overlying said elongated opening in registration therewith, said sleeve portion having an inner surface congruent with the perimeter of said elongated opening, said sleeve portion inner surface and said elongated opening having an inner contour slightly larger than the outer contour of said flat tube; inserting each of opposite ends of said flat tube through both said sleeve portion and said elongated opening of a respective brazing filler member, and thereafter inserting each of said flat tube ends into a respective one of said header pipes through said axial slot therein while bringing said arcuately curved plate portions in contact with the outer surface of the corresponding header pipe, and then heating said brazing filler members together with said header pipes and end portions of said flat tube to melt said brazing filler members, so that said header pipes are joined and brazed to the corresponding ends of said flat tube.

2. A method as claimed in claim 1 wherein said header pipes are provided respectively with an inlet tube portion and an outlet tube portion.

3. A method as claimed in claim 2 wherein said inlet tube portion is formed integral with one of said header pipes.

4. A method as claimed in claim 3 wherein said outlet tube portion is formed integral with the other of said header pipes.

5. A method as claimed in claim 1 wherein said step of preparing said flat tube includes forming said flat tube in a serpentine-anfractuous shape, and corrugated fin units are prepared from aluminum brazing sheets and disposed in spaces between adjacent parallel portions of said serpentine-anfractuous flat tube.

* * * * *